(12) United States Patent
Singh

(10) Patent No.: US 7,330,526 B2
(45) Date of Patent: Feb. 12, 2008

(54) SYSTEM AND METHOD OF STORING HIGH LEVEL WASTE

(75) Inventor: Krishna P. Singh, Palm Harbor, FL (US)

(73) Assignee: Holtec International, Inc.

( * ) Notice: Subject to any disclaimer, the term of this patent is extended or adjusted under 35 U.S.C. 154(b) by 10 days.

(21) Appl. No.: 11/123,590

(22) Filed: May 6, 2005

(65) Prior Publication Data

US 2006/0215803 A1    Sep. 28, 2006

Related U.S. Application Data

(60) Provisional application No. 60/671,552, filed on Apr. 15, 2005, provisional application No. 60/665,108, filed on Mar. 25, 2005.

(51) Int. Cl.
*G21C 19/00* (2006.01)

(52) U.S. Cl. ............... 376/272; 376/273; 250/506.1; 250/507.1; 588/1

(58) Field of Classification Search ............ 376/272, 376/273; 250/506.1, 507.1; 588/1
See application file for complete search history.

(56) References Cited

U.S. PATENT DOCUMENTS

| | | |
|---|---|---|
| 3,111,078 A | 11/1963 | Breckenridge |
| 3,111,586 A | 11/1963 | Rogers |
| 3,629,062 A | 12/1971 | Muenchow |
| 3,739,451 A | 6/1973 | Jacobson |
| 3,745,707 A | 7/1973 | Herr |
| 3,755,079 A | 8/1973 | Wesinstein et al. |
| 3,765,549 A | 10/1973 | Jones |
| 3,800,973 A | 4/1974 | Weaver |
| 3,836,267 A | 9/1974 | Schatz |
| 3,910,006 A | 10/1975 | James |
| 3,917,953 A | 11/1975 | Wodrich |
| 3,935,062 A | 1/1976 | Keller et al. |
| 3,945,509 A | 3/1976 | Weems |

(Continued)

FOREIGN PATENT DOCUMENTS

DE    3144113    5/1983

(Continued)

*Primary Examiner*—Ricardo J. Palabrica
(74) *Attorney, Agent, or Firm*—Brian L. Belles; Wolf, Block, Schorr and Solis-Cohen LLP

(57) ABSTRACT

A system and method for storing high level waste. In one aspect, the invention is a system comprising: an inner shell forming a cavity for receiving high level waste, the cavity having a top and a bottom; an outer shell surrounding the inner shell so as to form a space between the inner shell and the outer shell; at least one opening in the inner shell at or near the bottom of the cavity, the at least one opening forming a passageway from the space into the cavity; a lid positioned atop the inner and outer shells, the lid having at least one inlet vent forming a passageway from an ambient atmosphere to the space and at least one outlet vent forming a passageway from the cavity to the ambient atmosphere. In another aspect, the invention is a method of using the system to store high level waste. In yet another aspect, the invention does not require the aforementioned lid but further comprises a floor plate wherein the inner and outer shells rest atop and are connected to the floor plate.

30 Claims, 8 Drawing Sheets

U.S. PATENT DOCUMENTS

| | | | |
|---|---|---|---|
| 3,962,587 A | 6/1976 | Dufrane et al. | |
| 3,984,942 A | 10/1976 | Schroth | |
| 4,055,508 A | 10/1977 | Yoli et al. | |
| 4,078,968 A | 3/1978 | Golden et al. | |
| 4,158,599 A | 6/1979 | Andrews et al. | |
| 4,278,892 A | 7/1981 | Baatz et al. | |
| 4,288,698 A | 9/1981 | Baatz et al. | |
| 4,336,460 A | 6/1982 | Best et al. | |
| 4,355,000 A | 10/1982 | Lumelleau | |
| 4,366,095 A | 12/1982 | Takats et al. | |
| 4,394,022 A | 7/1983 | Gilmore | |
| 4,450,134 A | 5/1984 | Soot et al. | |
| 4,498,011 A | 2/1985 | Dyck et al. | |
| 4,526,344 A | 7/1985 | Oswald et al. | |
| 4,527,066 A | 7/1985 | Dyck et al. | |
| 4,532,104 A * | 7/1985 | Wearden et al. | 376/272 |
| 4,585,611 A | 4/1986 | Perl | |
| 4,634,875 A * | 1/1987 | Kugeler et al. | 250/506.1 |
| 4,635,477 A | 1/1987 | Simon | |
| 4,649,018 A | 3/1987 | Waltersdorf | |
| 4,663,533 A | 5/1987 | Kok et al. | |
| 4,666,659 A * | 5/1987 | Lusk et al. | 376/272 |
| 4,671,326 A | 6/1987 | Wilhelm | |
| 4,690,795 A | 9/1987 | Hardin et al. | |
| 4,764,333 A | 8/1988 | Minsall et al. | |
| 4,780,269 A | 10/1988 | Fischer et al. | |
| 4,800,062 A | 1/1989 | Craig et al. | |
| 4,834,916 A | 5/1989 | Chaudon et al. | |
| 4,847,009 A | 7/1989 | Madle et al. | |
| 4,851,183 A | 7/1989 | Hampel | |
| 4,971,752 A | 11/1990 | Parker | |
| 5,102,615 A | 4/1992 | Grande et al. | |
| 5,182,076 A | 1/1993 | de Seroux et al. | |
| 5,267,280 A | 11/1993 | Duquesne | |
| 5,297,917 A | 3/1994 | Freneix | |
| 5,319,686 A | 6/1994 | Pizzano et al. | |
| 5,469,936 A | 11/1995 | Lauga et al. | |
| 5,513,231 A | 4/1996 | Jones et al. | |
| 5,513,232 A | 4/1996 | Jones et al. | |
| 5,546,436 A | 8/1996 | Jones et al. | |
| 5,564,498 A | 10/1996 | Bochard | |
| 5,633,904 A | 5/1997 | Gilligan et al. | |
| 5,646,971 A | 7/1997 | Howe | |
| 5,661,768 A | 8/1997 | Gilligan et al. | |
| 5,753,925 A | 5/1998 | Yamanaka et al. | |
| 5,771,265 A | 6/1998 | Montazer | |
| 5,852,643 A * | 12/1998 | Copson | 376/287 |
| 5,862,195 A | 1/1999 | Peterson | |
| 6,064,710 A | 5/2000 | Singh | |
| 6,252,923 B1 * | 6/2001 | Iacovino et al. | 376/272 |
| 6,489,623 B1 * | 12/2002 | Peters et al. | 250/506.1 |
| 6,519,307 B1 | 2/2003 | Singh et al. | |
| 6,718,000 B2 | 4/2004 | Singh et al. | |
| 6,793,450 B2 * | 9/2004 | Singh et al. | 414/146 |
| 7,068,748 B2 * | 6/2006 | Singh | 376/272 |

FOREIGN PATENT DOCUMENTS

| | | |
|---|---|---|
| DE | 3404666 | 8/1985 |
| DE | 3515871 | 11/1986 |
| DE | 195 29 357 A1 | 8/1995 |
| EP | 0253730 | 1/1988 |
| EP | 1 061 011 A1 | 6/2000 |
| FR | 2434463 | 8/1979 |
| GB | 2327722 | 1/1999 |
| JP | 62-1851999 | 8/1987 |
| RU | 2168022 C | 6/2000 |

* cited by examiner

SYSTEM AND METHOD OF STORING HIGH LEVEL WASTE

CROSS-REFERENCE TO RELATED APPLICATIONS

The present claims the benefit of U.S. Provisional Patent Application 60/665,108, filed Mar. 25, 2005 and U.S. Provisional Patent Application 60/671,552, filed Apr. 15, 2005, both of which are hereby incorporated by reference in their entireties.

FIELD OF THE INVENTION

The present invention relates generally to the field of storing high level waste ("HLW"), and specifically to systems and methods for storing HLW, such as spent nuclear fuel, in ventilated vertical modules.

BACKGROUND OF THE INVENTION

The storage, handling, and transfer of HLW, such as spent nuclear fuel, requires special care and procedural safeguards. For example, in the operation of nuclear reactors, it is customary to remove fuel assemblies after their energy has been depleted down to a predetermined level. Upon removal, this spent nuclear fuel is still highly radioactive and produces considerable heat, requiring that great care be taken in its packaging, transporting, and storing. In order to protect the environment from radiation exposure, spent nuclear fuel is first placed in a canister. The loaded canister is then transported and stored in large cylindrical containers called casks. A transfer cask is used to transport spent nuclear fuel from location to location while a storage cask is used to store spent nuclear fuel for a determined period of time.

In a typical nuclear power plant, an open empty canister is first placed in an open transfer cask. The transfer cask and empty canister are then submerged in a pool of water. Spent nuclear fuel is loaded into the canister while the canister and transfer cask remain submerged in the pool of water. Once fully loaded with spent nuclear fuel, a lid is typically placed atop the canister while in the pool. The transfer cask and canister are then removed from the pool of water, the lid of the canister is welded thereon and a lid is installed on the transfer cask. The canister is then properly dewatered and filled with inert gas. The transfer cask (which is holding the loaded canister) is then transported to a location where a storage cask is located. The loaded canister is then transferred from the transfer cask to the storage cask for long term storage. During transfer from the transfer cask to the storage cask, it is imperative that the loaded canister is not exposed to the environment.

One type of storage cask is a ventilated vertical overpack ("VVO"). A VVO is a massive structure made principally from steel and concrete and is used to store a canister loaded with spent nuclear fuel (or other HLW). VVOs stand above ground and are typically cylindrical in shape and extremely heavy, weighing over 150 tons and often having a height greater than 16 feet. VVOs typically have a flat bottom, a cylindrical body having a cavity to receive a canister of spent nuclear fuel, and a removable top lid.

In using a VVO to store spent nuclear fuel, a canister loaded with spent nuclear fuel is placed in the cavity of the cylindrical body of the VVO. Because the spent nuclear fuel is still producing a considerable amount of heat when it is placed in the VVO for storage, it is necessary that this heat energy have a means to escape from the VVO cavity. This heat energy is removed from the outside surface of the canister by ventilating the VVO cavity. In ventilating the VVO cavity, cool air enters the VVO chamber through bottom ventilation ducts, flows upward past the loaded canister, and exits the VVO at an elevated temperature through top ventilation ducts. The bottom and top ventilation ducts of existing VVOs are located circumferentially near the bottom and top of the VVO's cylindrical body respectively, as illustrated in FIG. 1.

While it is necessary that the VVO cavity be vented so that heat can escape from the canister, it is also imperative that the VVO provide adequate radiation shielding and that the spent nuclear fuel not be directly exposed to the external environment. The inlet duct located near the bottom of the overpack is a particularly vulnerable source of radiation exposure to security and surveillance personnel who, in order to monitor the loaded overpacks, must place themselves in close vicinity of the ducts for short durations.

Additionally, when a canister loaded with spent nuclear fuel is transferred from a transfer cask to a storage VVO, the transfer cask is stacked atop the storage VVO so that the canister can be lowered into the storage VVO's cavity. Most casks are very large structures and can weigh up to 250,000 lbs. and have a height of 16 ft. or more. Stacking a transfer cask atop a storage VVO/cask requires a lot of space, a large overhead crane, and possibly a restraint system for stabilization. Often, such space is not available inside a nuclear power plant. Finally, above ground storage VVOs stand at least 16 feet above ground, thus, presenting a sizable target of attack to a terrorist.

FIG. 1 illustrates a traditional prior art VVO 2. Prior art VVO 2 comprises flat bottom 17, cylindrical body 12, and lid 14. Lid 14 is secured to cylindrical body 12 by bolts 18. Bolts 18 serve to restrain separation of lid 14 from body 12 if prior art VVO 2 were to tip over. Cylindrical body 12 has top ventilation ducts 15 and bottom ventilation ducts 16. Top ventilation ducts 15 are located at or near the top of cylindrical body 12 while bottom ventilation ducts 16 are located at or near the bottom of cylindrical body 12. Both bottom ventilation ducts 16 and top ventilation ducts 15 are located around the circumference of the cylindrical body 12. The entirety of prior art VVO 2 is positioned above grade.

As understood by those skilled in the art, the existence of the top ventilation ducts 15 and/or the bottom ventilation ducts 16 in the body 12 of the prior art VVO 2 require additional safeguards during loading procedures to avoid radiation shine.

DISCLOSURE OF THE PRESENT INVENTION

It is an object of the present invention to provide a system and method for storing HLW that reduces the height of the stack assembly when a transfer cask is stacked atop a storage VVO.

It is another object of the present invention to provide a system and method for storing HLW that requires less vertical space.

Yet another object of the present invention is to provide a system and method for storing HLW that utilizes the radiation shielding properties of the subgrade during storage while providing adequate ventilation of the high level waste.

A further object of the present invention is to provide a system and method for storing HLW that provides the same or greater level of operational safeguards that are available inside a fully certified nuclear power plant structure.

A still further object of the present invention is to provide a system and method for storing HLW that decreases the dangers presented by earthquakes and other catastrophic events and virtually eliminates the potential of damage from a World Trade Center or Pentagon type of attack on the stored canister.

It is also an object of the present invention to provide a system and method for storing HLW that allows for an ergonomic transfer of the HLW from a transfer cask to a storage container.

Another object of the present invention is to provide a system and method for storing HLW below or above grade.

Yet another object of the present invention is to provide a system and method of storing HLW that reduces the amount of radiation emitted to the environment.

Still another object of the present invention is to provide a system and method of storing HLW that eliminates the dangers of radiation shine during loading procedures and/or subsequent storage.

A still further object of the present invention is to provide a system and method of storing HLW that locates openings for both the inlet and outlet vents in a removable lid.

A yet further object of the present invention is to provide a system and method of storing HLW that leads to convenient manufacture and site construction.

These and other objects are met by the present invention which, in some embodiments, is a system for storing high level waste comprising: an inner shell forming a cavity for receiving high level waste, the cavity having a top and a bottom; an outer shell surrounding the inner shell so as to form a space between the inner shell and the outer shell; at least one opening in the inner shell at or near the bottom of the cavity, the at least one opening forming a passageway from the space into the cavity; a lid positioned atop the inner and outer shells, the lid having at least one inlet vent forming a passageway from an ambient atmosphere to the space and at least one outlet vent forming a passageway from the cavity to the ambient atmosphere. Depending on the exact storage needs, the apparatus can be adapted for either above or below grade storage of high level waste.

In other embodiments, the invention is a method of storing high level waste comprising: (a) providing an apparatus comprising an inner shell forming a cavity having a top and a bottom, an outer shell concentric with and surrounding the inner shell so as to form a space therebetween, and at least one opening in the inner shell at or near the bottom of the cavity, the at least one opening forming a passageway from the space into the cavity; (b) placing a canister of high level waste into the cavity; (c) providing a lid having at least one inlet vent and at least one outlet vent; (d) positioning the lid atop the inner and outer shells so that the at least one inlet vent forms a passageway from an ambient atmosphere to the space and the at least one outlet vent forms a passageway from the cavity to the ambient atmosphere; and (e) cool air entering the cavity via the at least inlet vent and the space, the cool air being warmed by the canister of high level waste, and exiting the cavity via the at least one outlet vent in the lid.

In still other embodiments, the invention is a system for storing high level waste comprising: an inner shell forming a cavity for receiving high level waste, the cavity having a top and a bottom; an outer shell surrounding the inner shell so as to form a space between the inner shell and the outer shell; a floor plate, the inner and outer shells positioned atop and connected to the floor plate; and at least one opening in the inner shell at or near the bottom of the cavity, the at least one opening forming a passageway from the space into the cavity.

DETAILED DESCRIPTION OF THE DRAWINGS

Figure 1:
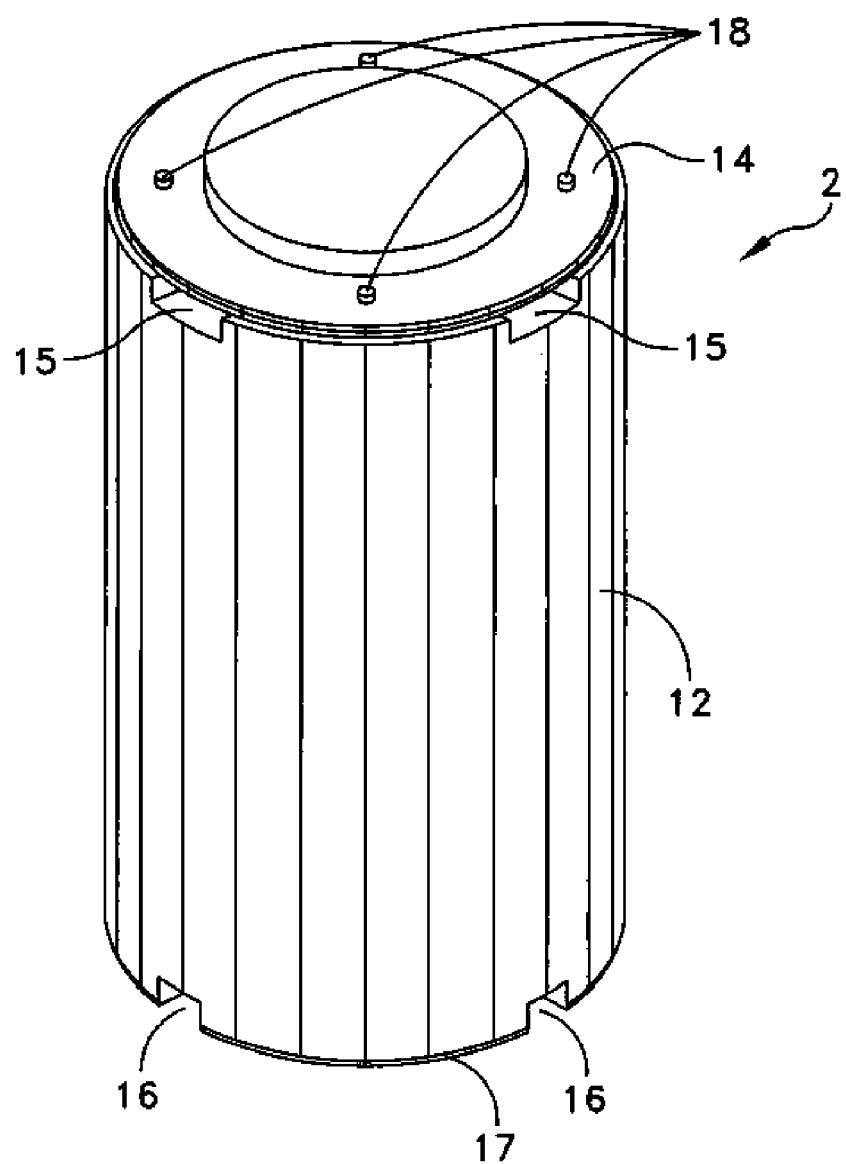
FIG. 1 is a top perspective view of a prior art VVO.
Figure 2:
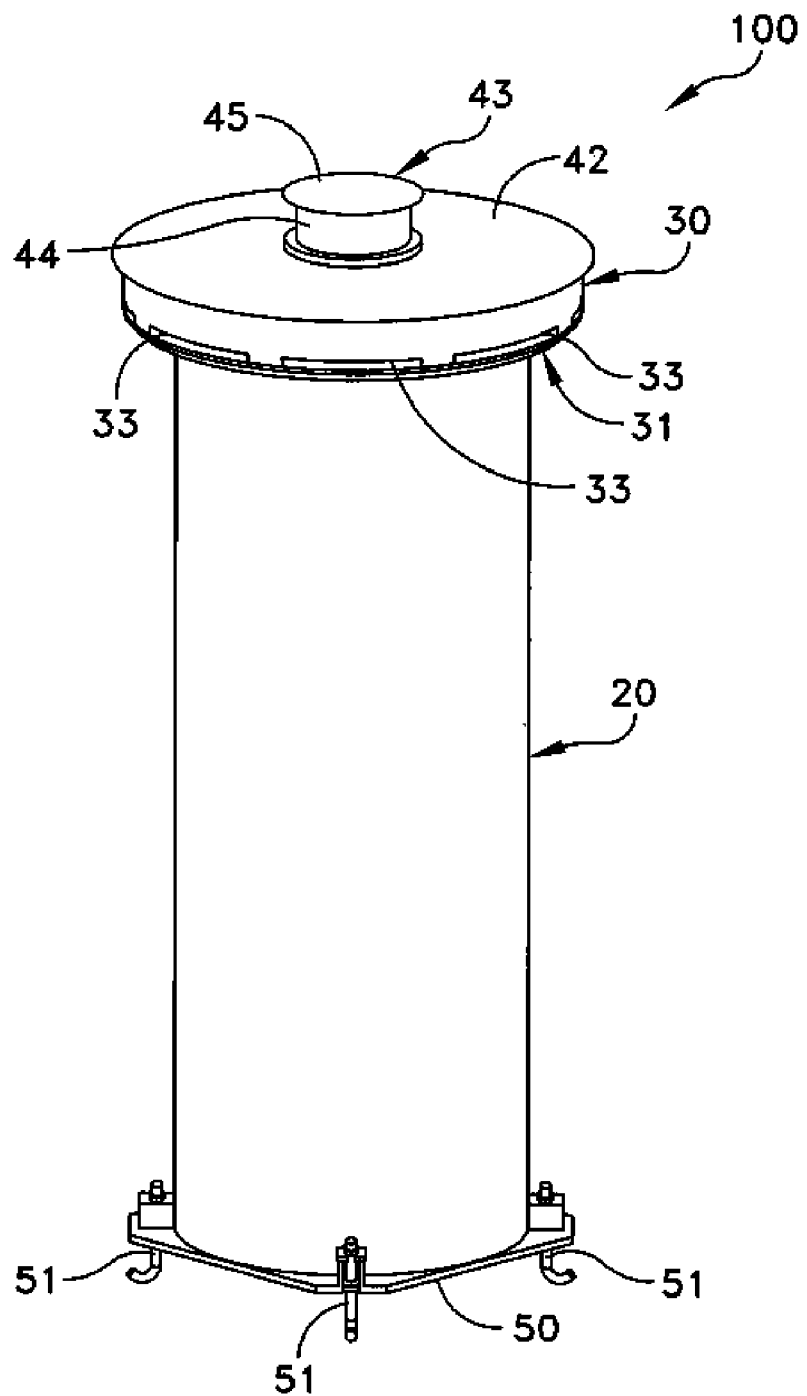
FIG. 2 a top perspective view of a HLW storage container according to an embodiment of the present invention.

FIG. 2 illustrates a high level waste ("HLW") storage container 100 designed according to an embodiment of the present invention. While the HLW storage container 100 will be described in terms of being used to store a canister of spent nuclear fuel, it will be appreciated by those skilled in the art that the systems and methods described herein can be used to store any and all kinds of HLW.

The HLW storage container 100 is designed to be a vertical, ventilated dry system for storing HLW such as spent fuel. The HLW storage container 100 is fully compatible with 100 ton and 125 ton transfer casks for HLW transfer procedures, such as spent fuel canister transfer operations. All spent fuel canister types engineered for storage in free-standing, below grade, and/or anchored overpack models can be stored in the HLW storage container 100.

As used herein the term "canister" broadly includes any spent fuel containment apparatus, including, without limitation, multi-purpose canisters and thermally conductive casks. For example, in some areas of the world, spent fuel is transferred and stored in metal casks having a honeycomb grid-work/basket built directly into the metal cask. Such casks and similar containment apparatus qualify as canisters, as that term is used herein, and can be used in conjunction with the HLW storage container 100 can as discussed below.

The HLW storage container 100 can be modified/designed to be compatible with any size or style of transfer cask. The HLW storage container 100 can also be designed to accept spent fuel canisters for storage at an Independent Spent Fuel Storage Installations ("ISFSI"). ISFSIs employing the HLW storage container 100 can be designed to accommodate any number of the HLW storage container 100 and can be expanded to add additional HLW storage containers 100 as the need arises. In ISFSIs utilizing a plurality of the HLW storage container 100, each HLW storage container 100 functions completely independent form any other HLW storage container 100 at the ISFSI.

The HLW storage container 100 comprises a body portion 20 and a lid 30. The body portion 20 comprises a floor plate 50. The floor plate 50 has a plurality of anchors 51 mounted thereto for securing the HLW storage container 100 to a base, floor, or other stabilization structure. The lid 30 rests atop and is removable/detachable from the body portion 20. As will be discussed in greater detail below, the HLW storage container 100 can be adapted for use as an above or below grade storage system.

Figure 3:
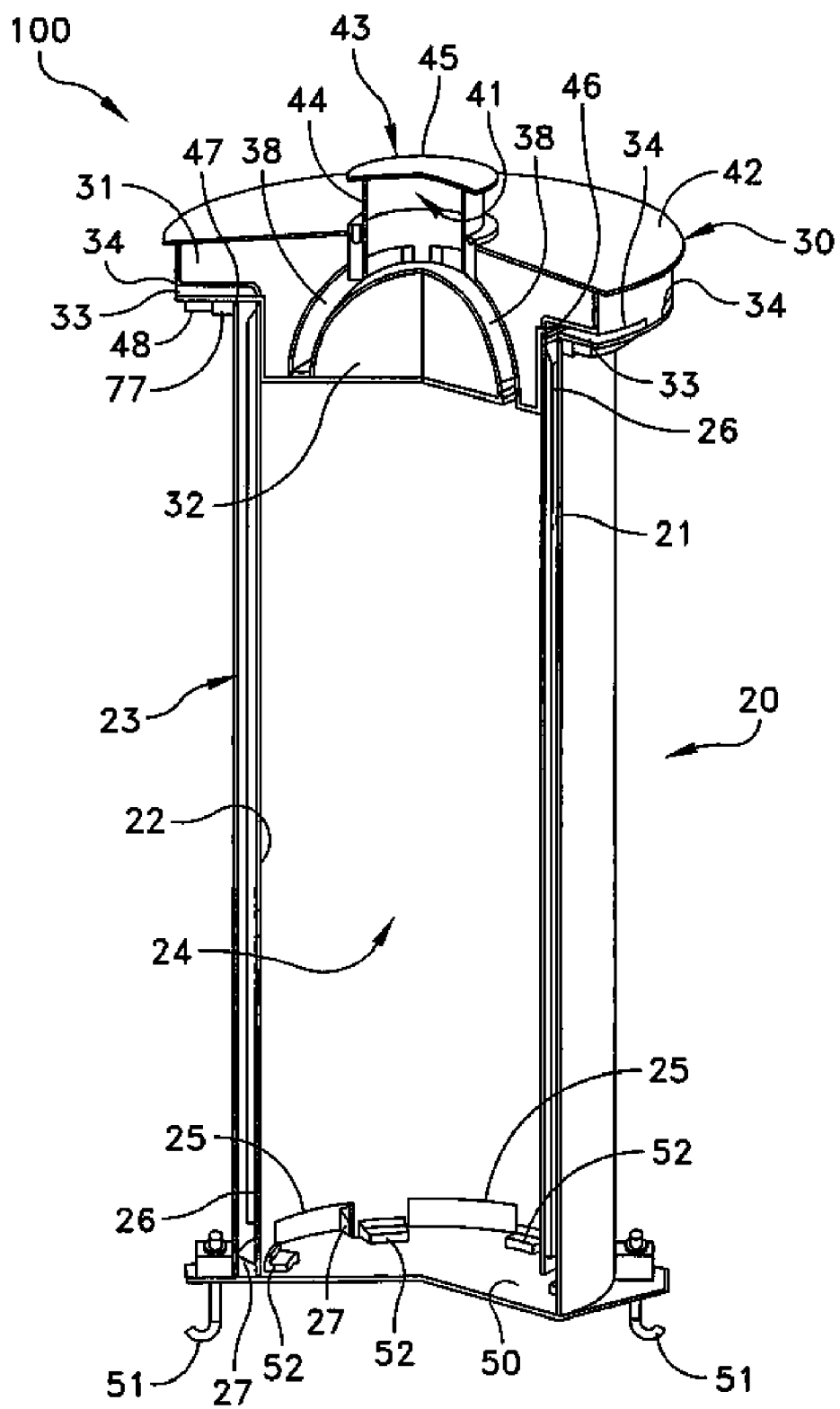
FIG. 3 is a sectional view of the HLW storage container of FIG. 2.

Referring now to FIG. 3, the body portion 20 comprises an outer shell 21 and an inner shell 22. The outer shell 21 surrounds the inner shell 22, forming a space 23 therebetween. The outer shell 21 and the inner shell 22 are generally cylindrical in shape and concentric with one another. As a result, the space 23 is an annular space. While the shape of the inner and outer shells 22, 21 is cylindrical in the illustrated embodiment, the shells can take on any shape, including without limitation rectangular, conical, hexagonal, or irregularly shaped. In some embodiments, the inner and outer shells 22, 22 will not be concentrically oriented.

As will be discussed in greater detail below, the space 23 formed between the inner shell 22 and the outer shell 21 acts as a passageway for cool air. The exact width of the space 23 for any HLW storage container 100 is determined on a cases-by-case design basis, considering such factors as the heat load of the HLW to be stored, the temperature of the cool ambient air, and the desired fluid flow dynamics. In some embodiments, the width of the space 23 will be in the range of 1 to 6 inches. While the width of space 23 can vary circumferentially, it may be desirable to design the HLW storage container 100 so that the width of the space 23 is generally constant in order to effectuate symmetric cooling of the HLW container and even fluid flow of the incoming air.

The inner shell 22 and the outer shell 21 are secured atop floor plate 50. The floor plate 50 is square in shape but can take on any desired shape. A plurality of spacers 27 are secured atop the floor plate 50 within the space 23. The spacers 27 act as guides during placement of the inner and outer shells 22, 21 atop the floor plate 50 and ensure that the integrity of the space 23 is maintained throughout the life of the HLW storage container 100. The spacers 27 can be constructed of low carbon steel or another material and welded to the floor plate 50.

Preferably, the outer shell 21 is seal joined to the floor plate 50 at all points of contact, thereby hermetically sealing the HLW storage container 100 to the ingress of fluids through these junctures. In the case of weldable metals, this seal joining may comprise welding or the use of gaskets. Most preferably, the outer shell 21 is integrally welded to the floor plate 50.

A ring flange 77 is provided around the top of the outer shell 21 to stiffen the outer shell 21 so that it does not buckle or substantially deform under loading conditions. The ring flange 77 can be integrally welded to the top of the outer shell 21.

The inner shell 22 is laterally and rotationally restrained in the horizontal plane at its bottom by the spacers 27 and support blocks 52. The inner shell 22 is preferably not welded or otherwise permanently secured to the bottom plate 50 or outer shell 21 so as to permit convenient removal for decommissioning, and if required, for maintenance. The bottom edge of the inner shell 22 is equipped with a tubular guide (not illustrated) that also provides flexibility to permit the inner shell 22 to expand from its contact with the air heated by the canister in the cavity 24 without inducing excessive upward force on the lid 30.

The inner shell 22, the outer shell 21, the floor plate 50, and the ring flange 77 are preferably constructed of a metal, such as a thick low carbon steel, but can be made of other materials, such as stainless steel, aluminum, aluminum-alloys, plastics, and the like. Suitable low carbon steels include, without limitation, ASTM A516, Gr. 70, A515 Gr. 70 or equal. The desired thickness of the inner and outer shells 22, 21 is matter of design and will determined on a case by case basis. However, in some embodiments, the inner and outer shells 22, 22 will have a thickness between ½ to 3 inches.

Figure 8:
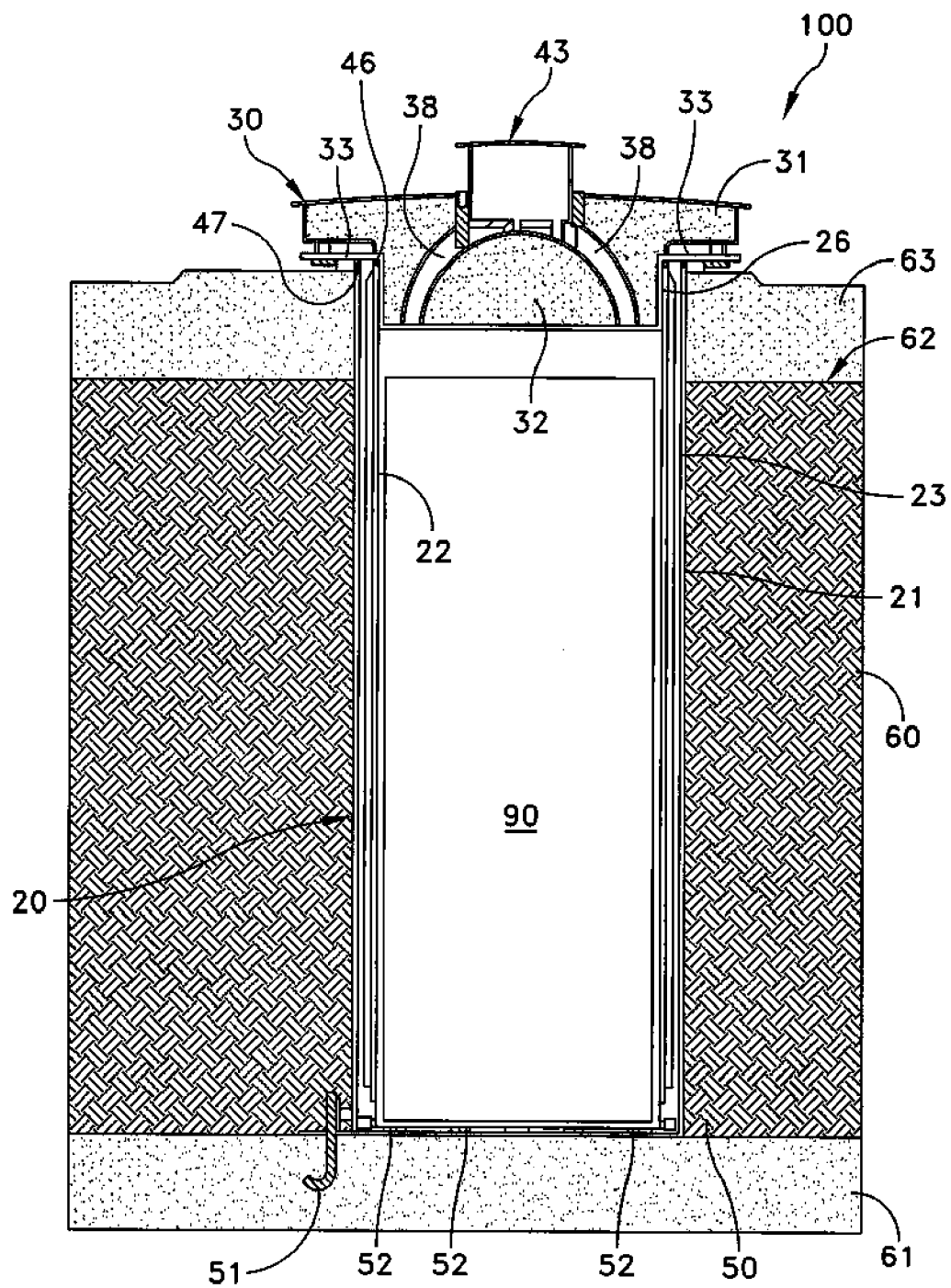
FIG. 8 is a sectional view of the HLW storage container of FIG. 6 having a canister of HLW positioned therein for storage

The inner shell 22 forms a cavity 24. The size and shape of the cavity 24 is not limiting of the present invention. However, it is preferred that the inner shell 22 be selected so that the cavity 24 is sized and shaped so that it can accommodate a canister of spent nuclear fuel or other HLW. While not necessary to practice the invention, it is preferred that the horizontal cross-sectional size and shape of the cavity 24 be designed to generally correspond to the horizontal cross-sectional size and shape of the canister-type that is to be used in conjunction with that particular HLW storage container 100. More specifically, it is desirable that the size and shape of the cavity 24 be designed so that when a canister containing HLW is positioned in cavity 24 for storage (as illustrated in FIG. 8), a small clearance exists between the outer side walls of the canister and the side walls of the cavity 24.

Designing the cavity 24 so that a small clearance is formed between the side walls of the stored canister and the side walls of the cavity 24 limits the degree the canister can move within the cavity during a catastrophic event, thereby minimizing damage to the canister and the cavity walls and prohibiting the canister from tipping over within the cavity. This small clearance also facilitates flow of the heated air during HLW cooling. The exact size of the clearance can be controlled/designed to achieve the desired fluid flow dynamics and heat transfer capabilities for any given situation. In some embodiments, for example, the clearance may be 1 to 3 inches. A small clearance also reduces radiation streaming.

The inner shell 22 is also equipped with equispaced longitudinal ribs (not illustrated) at an elevation that is aligned with the top lid of a canister of HLW stored in the cavity 24. These ribs provide a means to guide a canister of HLW down into the cavity 24 so that the canister properly rests atop the support blocks 52. The ribs also serve to limit the canister's lateral movement during an earthquake or other catastrophic event to a fraction of an inch.

A plurality of openings 25 are provided in the inner shell 22 at or near its bottom. The openings 25 provide a passageway between the annular space 23 and the bottom of the cavity 24. The openings 25 provide passageways by which fluids, such as air, can pass from the annular space 23 into the cavity 24. The opening 25 are used to facilitate the inlet of cool ambient air into the cavity 24 for cooling stored HLW having a heat load. In the illustrated embodiment, six opening 25 are provided. However, any number of openings 25 can be provided. The exact number will be determined on a case-by-case basis and will dictated by such consideration as the heat load of the HLW, desired fluid flow dynamics, etc. Moreover, while the openings 25 are illustrated as being located in the side wall of the inner shell 22, the openings 25 can be provided in the floor plate 50 in certain modified embodiments of the HLW storage container 100.

In some embodiments, the openings 25 may be symmetrically located around the bottom of the inner shell 22 in a circumferential orientation to enable the incoming cool air streaming down the annular space 23 to enter the cavity 24 in a symmetric manner.

The opening 25 in the inner shell 22 are sufficiently tall to ensure that if the cavity 24 were to become filled with water, the bottom region of a canister resting on the support blocks 52 would be submerged for several inches before the water level reaches the top edge of the openings 25. This design feature ensures thermal performance of the system under any conceivable accidental flooding of the cavity 24 by any means whatsoever.

A layer of insulation 26 is provided around the outside surface of the inner shell 22 within the annular space 23. The insulation 26 is provided to minimize the heat-up of the incoming cooling air in the space 23 before it enters the cavity 24. The insulation 26 helps ensure that the heated air rising around a canister situated in the cavity 24 causes minimal pre-heating of the downdraft cool air in the annular space 23. The insulation 26 is preferably chosen so that it is water and radiation resistant and undegradable by accidental wetting. Suitable forms of insulation include, without limitation, blankets of alumina-silica fire clay (Kaowool Blanket), oxides of alimuna and silica (Kaowool S Blanket), alumina-silica-zirconia fiber (Cerablanket), and alumina-silica-chromia (Cerachrome Blanket). The desired thickness of the layer of insulation 26 is matter of design and will be dictated by such considerations such as the heat load of the HLW, the thickness of the shells, and the type of insulation used. In some embodiments, the insulation will have a thickness in the range ½ to 6 inches.

A plurality of support blocks 52 are provided on the floor (formed by floor plate 50) of the cavity 24. The support blocks 52 are provided on the floor of cavity 24 so that a canister holding HLW, such as spent nuclear fuel, can be placed thereon. The support blocks 52 are circumferentially spaced from one another and positioned between each of the openings 25 near the six sectors of the inner shell 22 that contact the bottom plate 50. When a canister holding HLW is loaded into the cavity 24 for storage, the bottom surface of the canister rests atop the support blocks 52, forming an inlet air plenum between the bottom surface of the HLW canister and the floor of cavity 24. This inlet air plenum contributes to the fluid flow and proper cooling of the canister.

The support blocks 52 can be made of low carbon steel and are preferably welded to the floor of the cavity 24. In some embodiments, the top surfaces of the support blocks 52 will be equipped with a stainless steel liner so that the canister of HLW does not rest on a carbon steel surface. Other suitable materials of construction for the support blocks 52 include, without limitation, reinforced-concrete, stainless steel, plastics, and other metal alloys. The support blocks 52 also serve an energy/impact absorbing function. In some embodiments, the support blocks 52 are preferably of a honeycomb grid style, such as those manufactured by Hexcel Corp., out of California, U.S.

The lid 30 rests atop and is supported by the tops edges of the inner and outer shells 22, 21. The lid 30 encloses the top of the cavity 24 and provides the necessary radiation shielding so that radiation can not escape from the top of the cavity 24 when a canister loaded with HLW is stored therein. The lid 30 is specially designed to facilitate in both the introduction of cool air to the space 23 (for subsequent introduction to the cavity 24) and the release of warmed air from the cavity 24. In some embodiments, the invention is the lid itself, independent of all other aspects of the HLW storage container 100.

Figure 4:
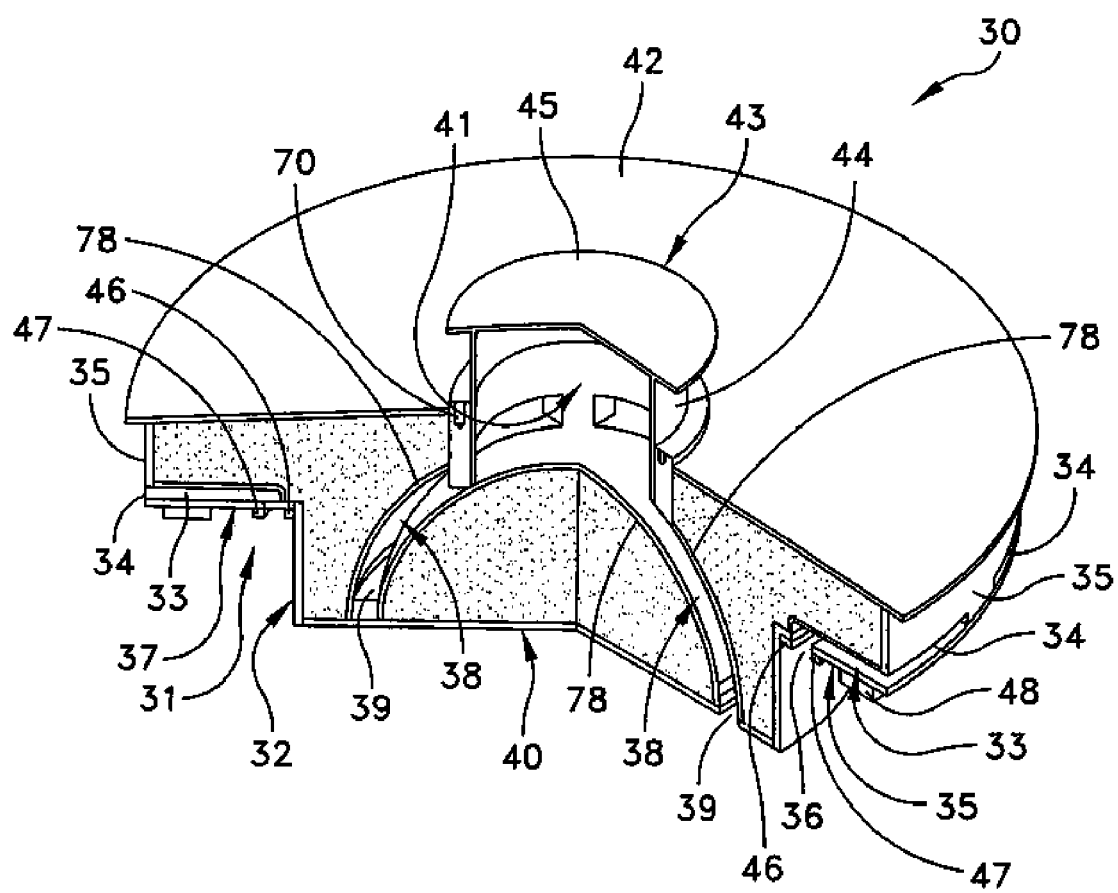
FIG. 4 is a sectional view of a lid according to an embodiment of the present invention removed from the HLW storage container of FIG. 2.
Figure 5:
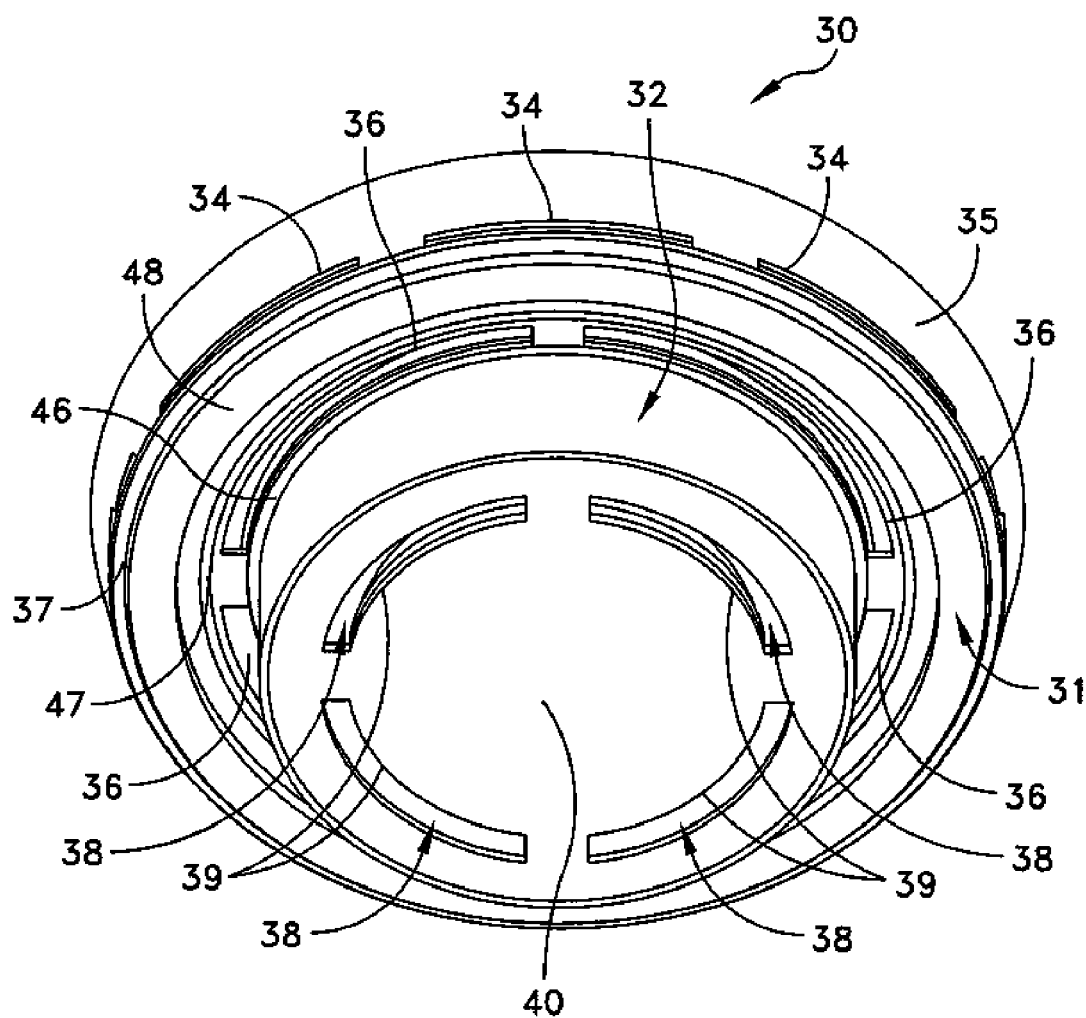
FIG. 5 is a bottom perspective view of the lid of FIG. 4 according to an embodiment of the present invention.

FIGS. 4 and 5 illustrate the lid 30 in detail according to an embodiment of the present invention. In some embodiments, the lid 30 will be a steel structure filled with shielding concrete. The design of the lid 30 is preferably designed to fulfill a number of performance objectives.

Referring first to FIG. 4, a top perspective view of the lid 30 removed from the body portion 20 of the HLW storage container 100 is illustrated. In order to provide the requisite radiation shielding, the lid 30 is constructed of a combination of low carbon steel and concrete. More specifically, in constructing one embodiment of the lid 30, a steel lining is provided and filled with concrete (or another radiation absorbing material). In other embodiments, the lid 30 can be constructed of a wide variety of materials, including without limitation metals, stainless steel, aluminum, aluminum-alloys, plastics, and the like. In some embodiments, the lid may be constructed of a single piece of material, such as concrete or steel for example.

The lid 30 comprises a flange portion 31 and a plug portion 32. The plug portion 32 extends downward from the flange portion 31. The flange portion 31 surrounds the plug portion 32, extending therefrom in a radial direction. A plurality of inlet vents 33 are provided in the lid 30. The inlet vents 33 are circumferentially located around the lid 30. Each inlet vent 30 provides a passageway from an opening 34 in the side wall 35 to an opening 36 in the bottom surface 37 of the flange portion 31.

A plurality of outlet vents 38 are provided in the lid 30. Each outlet vent 38 forms a passageway from an opening 39 in the bottom surface 40 of the plug portion 32 to an opening 41 in the top surface 42 of the lid 30. A cap 43 is provided over opening 41 to prevent rain water or other debris from entering and/or blocking the outlet vents 38. The cap 43 is secured to the lid 30 via bolts 70 or through any other suitable connection, including without limitation welding, clamping, a tight fit, screwing, etc.

The cap 43 is designed to prohibit rain water and other debris from entering into the opening 41 while affording heated air that enters the opening 41 to escape therefrom. In one embodiment, this can be achieved by providing a plurality of small holes (not illustrated) in the wall 44 of the cap 43 just below the overhang of the roof 45 of the cap. In other embodiments, this can be achieved by non-hermetically connecting the roof 45 of the cap 43 to the wall 44 and/or constructing the cap 43 (or portions thereof) out of material that is permeable only to gases. The opening 41 is located in the center of the lid 30.

By locating both the inlet vents 30 and outlet vents 38 in the lid 30, there is no lateral radiation leakage path during the lowering or raising of a canister of HLW in the cavity 24 during loading and unloading operations. Thus, the need for shield blocking, which is necessary in some prior art VVOs is eliminated. Both the inlet vents 30 and the outlet vents 38 are preferably radially symmetric so that the air cooling action in the system is not affected by the change in the horizontal direction of the wind. Moreover, by locating the opening 34 of the inlet vent 30 at the periphery of the lid 30 and the opening 41 for the outlet vents 38 at the top central axis of the lid, mixing of the entering cool air stream and the exiting warm air stream is essentially eliminated.

In order to further protect against rain water or other debris entering opening 41, the top surface 42 of the lid 30 is curved and sloped away from the opening 41 (i.e., downward and outward). Positioning the opening 41 away from the openings 34 helps prevent the heated air that exits via the outlet vents 38 from being drawn back into the inlet vents 35. The top surface 42 of the lid 30 (which acts as a roof) overhangs beyond the side wall 35 of the flange portion 31, thereby helping to prohibit rain water and other debris from entering the inlet vents 33. The overhang also helps prohibit mixing of the cool and heated air streams. The curved shape of the increases the load bearing capacity of the lid 30 much in the manner that a curved beam exhibits considerably greater lateral load bearing capacity than its straight counterpart.

The outlet vents 38 are specifically curved so that a line of sight does not exist therethrough. This prohibits a line of sight from existing from the ambient air to an HLW canister that is loaded in the HLW storage container 100, thereby eliminating radiation shine into the environment. In other embodiments, the outlet vents may be angled or sufficiently tilted so that such a line of sight does not exist. The inlet vents 33 are in a substantially horizontal orientation. However, the shape and orientation of the inlet and outlet vents 33, 38 can be varied.

The inlet and outlet vents 30, 38 are made of "formed and flued" heads (i.e., surfaces of revolution) that serve three major design objectives. First, the curved shape of the inlet and outlet vents 30, 38 eliminate any direct line of sight from the cavity 24 and serve as an effective means to scatter the photons streaming from the HLW. Second, the curved steel plates 78 that form outlet vent passageway 38 significantly increase the load bearing capacity of the lid 30 much in the manner that a curved beam exhibits considerably greater lateral load bearing capacity in comparison to its straight counterpart. This design feature is a valuable attribute if a beyond-the-design basis impact scenario involving a large and energetic missile needs to be evaluated for a particular ISFSI site. Third, the curved nature of the inlet vents 30 provide for minimum loss of pressure in the coolant air stream, resulting in a more vigorous ventilation action.

In some embodiments it may be preferable to provide screens covering all of the openings into the inlet and outlet vents 30, 38 to prevent debris, insects, and small animals from entering the cavity 24 or the vents 30, 38.

Referring now to FIG. 5, the lid 30 further comprises a first gasket seal 46 and a second gasket seal 47 on the bottom surface 37 of the flange portion 31. The gaskets 46, 47 are preferably constructed of a radiation resistant material. When the lid 30 is positioned atop the body portion 20 of the HLW storage container 100 (as shown in FIG. 3), the first gasket seal 46 is compressed between the bottom surface 37 of the flange portion 31 of the lid 30 and the top edge of the inner shell 22, thereby forming a seal. Similarly, when the lid 30 is positioned atop the body portion 20 of the HLW storage container 100, the second gasket seal 47 is compressed between the bottom surface 37 of the flange portion 31 of the lid 30 and the top edge of the outer shell 21, thereby forming a second seal.

A container ring 48 is provided on the bottom surface 35 of the flange portion 31. The container ring 48 is designed to extend downward from the bottom surface 35 and peripherally surround and engage the outside surface of the top of the outer shell 22 when the lid 30 is positioned atop the body portion 20 of the HLW storage container 100, as shown in FIG. 3.

Referring again to FIG. 3, the cooperational relationship of the elements of the lid 30 and the elements of the body portion 20 will now be described. When the lid 30 is properly positioned atop the body portion 20 of the HLW storage container 100 (e.g., during the storage of a canister loaded with HLW), the plug portion 32 of the lid 30 is lowered into the cavity 24 until the flange portion 31 of the lid 30 contacts and rests atop the inner shell 22 and the flange ring 77. The flange portion 31 eliminates the danger of the lid 30 falling into the cavity 24.

When the lid 30 is positioned atop the body portion 20, the first and second gasket seals 46, 47 are respectively compressed between the flange portion 31 of the lid 30 and the top edges of the inner and outer shells 22, 21, thereby forming hermetically sealed interfaces. The first gasket 46 provides a positive seal at the lid/inner shell interface, prohibiting mixing of the cool air inflow stream through the annular space 23 and the warm air outflow stream at the top of the cavity 24. The second gasket 47 provides a seal at the lid/outer shell interface, providing protection against floodwater that may rise above the flange ring 77 itself.

The container flange 48 surrounds and peripherally engages the flange ring 77. The flange ring 77 restrains the lid 30 against horizontal movement, even during design basis earthquake events. When so engaged, the lid 30 retains the top of the inner shell 22 against lateral, axial movement. The lid 30 also provides stability, shape, and proper alignment/orientation of the inner and outer shells 22, 21.

The extension of plug portion 32 of the lid 30 into the cavity 24 helps reduce the overall height of the HLW storage container 100. Because the plug portion 32 is made of steel filled with shielding concrete, the plug portion 32 blocks the skyward radiation emanating from a canister of HLW from escaping into the environment. The height of the plug portion 32 is designed so that if the lid 30 were accidentally dropped during its handling, it would not contact the top of a canister of HLW positioned in the cavity 24.

When the lid 30 is positioned atop the body portion 20, the inlet vents 33 are in spatial cooperation with the space 23 formed between the inner and outer shells 22, 21. The outlet vents 38 are in spatial cooperation with the cavity 24. As a result, cool ambient air can enter the HLW storage container 100 through the inlet vents 33, flow into the space 23, and into the bottom of the cavity 24 via the openings 25. When a canister containing HLW having a heat load is supported within the cavity 24, this cool air is warmed by the HLW canister, rises within the cavity 24, and exits the cavity 24 via the outlet ducts 38.

Because the openings 34 (best visible in FIG. 4) of the inlet vents 30 extend around the circumference of the lid 30, the hydraulic resistance to the incoming air flow, a common limitation in ventilated modules, is minimized. Circumferentially circumscribing the openings 34 of the inlet vents 30 also results in the inlet vents 30 being less apt to becoming completely blocked under even the most extreme environmental phenomena involving substantial quantities of debris. Similar air flow resistance minimization is built into the design of the inlet vents 38 for the exiting air.

As mentioned above, the HLW storage container 100 can be adapted for either above or below grade storage of HLW. When adapted for above grade storage of HLW, the HLW storage container 100 will further comprises a radiation absorbing structure/body surrounding the body portion 20. The radiation absorbing structure will be of a material, and of sufficient thickness so that radiation emanating from the HLW canister is sufficiently absorbed/contained. In some embodiments, the radiation absorbing structure can be a concrete monolith. Moreover, in some embodiment, the outer shell may be formed by an inner wall of the radiation absorbing structure itself.

Figure 6:
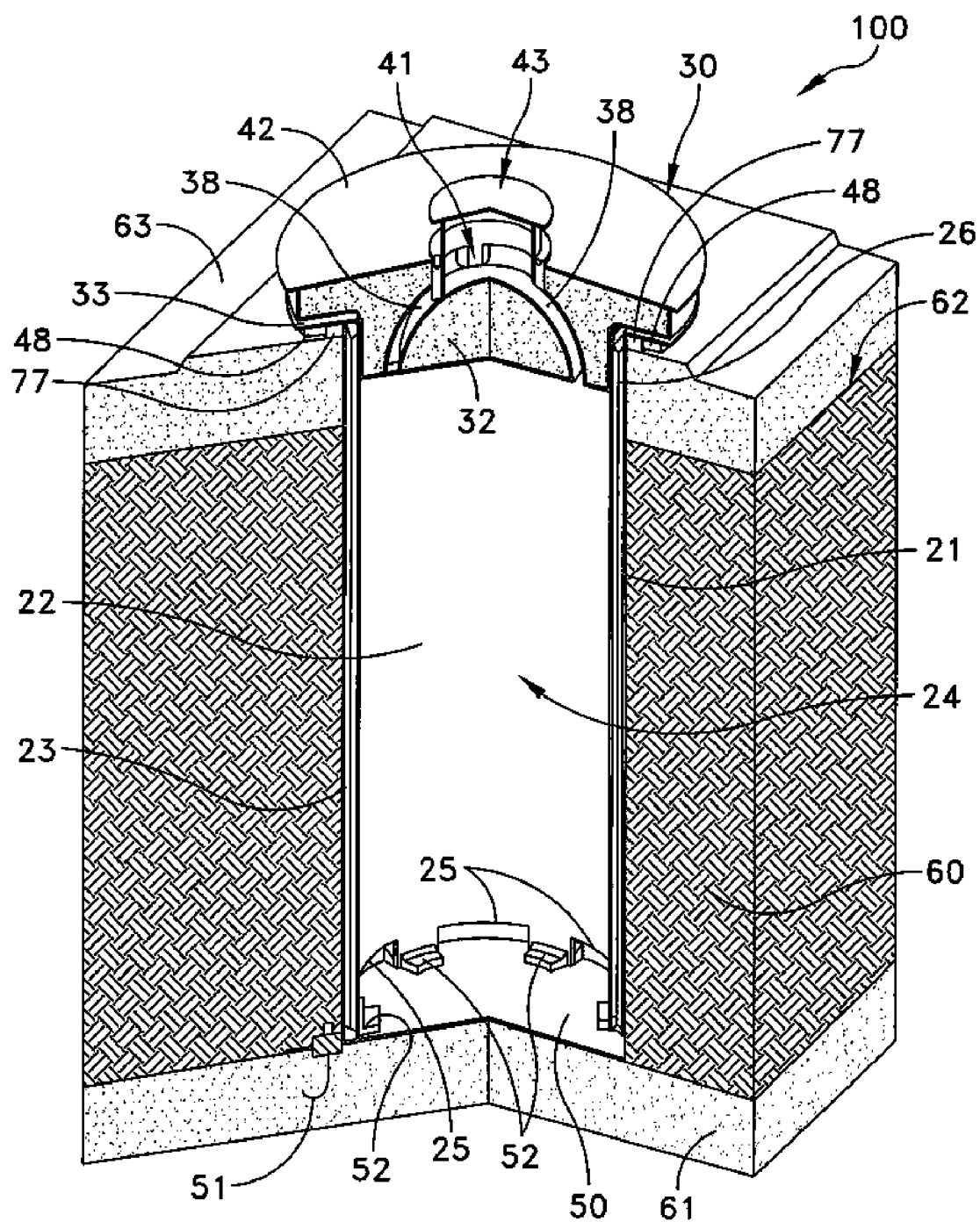
FIG. 6 is a sectional view of the HLW storage container of FIG. 2 positioned for the below grade storage of HLW.
Figure 7:
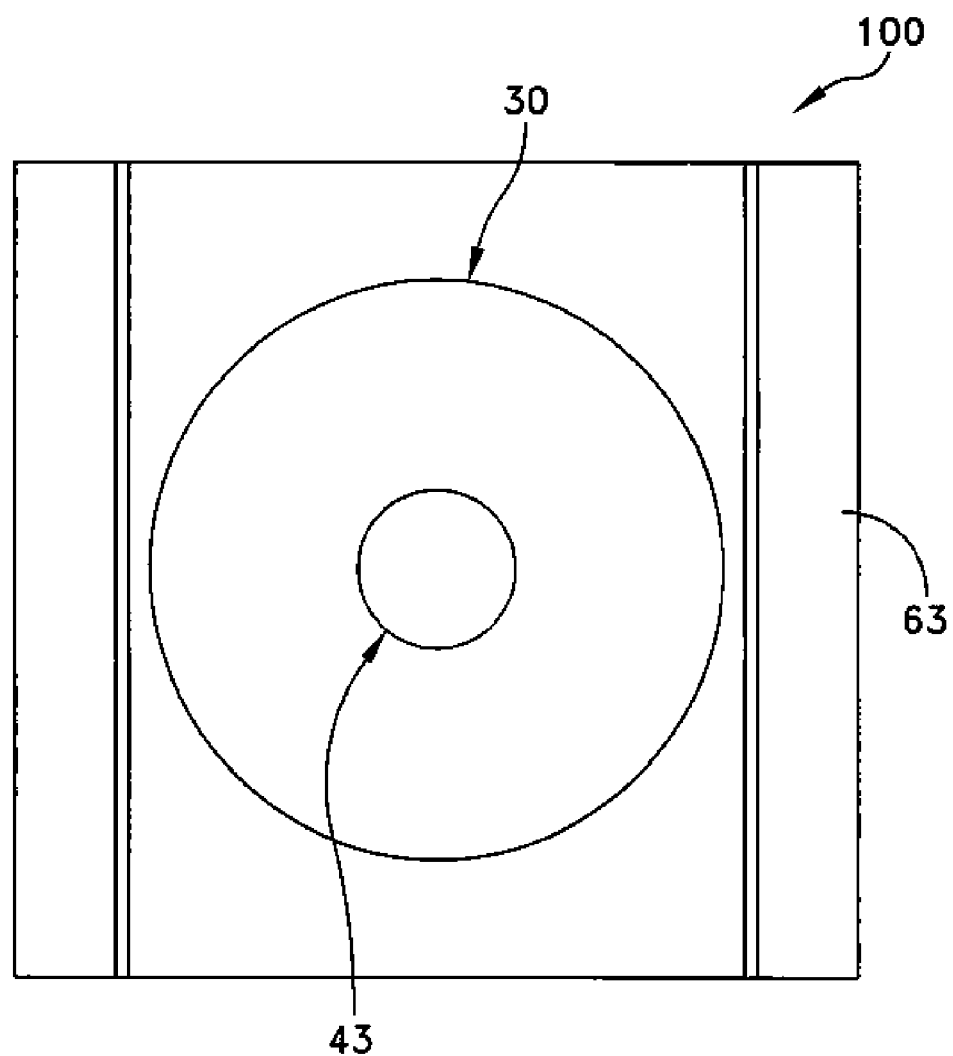
FIG. 7 is a top view of the HLW storage container of FIG. 6.

Referring now to FIGS. 6 and 7, the adaptation and use of the HLW storage container 100 for the below grade storage of HLW at an ISFSI, or other location will be described, according to one embodiment of the present invention.

Referring to FIG. 6, a hole is first dug into the ground at a desired position within the ISFSI and at a desired depth. Once the hole is dug, and its bottom properly leveled, a base 61 is placed at the bottom of hole. The base 61 is a reinforced concrete slab designed to satisfy the load combinations of recognized industry standards, such as ACI-349. However, in some embodiments, depending on the load to be supported and/or the ground characteristics, the use of a base may be unnecessary. The base 61 designed to meet certain structural criteria and to prevent long-term settlement and physical degradation from aggressive attack of the materials in the surrounding sub-grade.

Once the base 61 is properly positioned in the hole, the HLW storage container 100 is lowered into the hole in a vertical orientation until it rests atop the base 61. The floor plate 50 contacts and rests atop the top surface of base 61. The floor plate 50 is then secured to the base 61 via anchors 51 to prohibit future movement of the HLW storage container 100 with respect to the base 61.

The hole is preferably dug so that when the HLW storage container 100 is positioned therein, at least a majority of the inner and outer shells 22, 21 are below ground level 62. Most preferably, the hole is dug so that only 1 to 4 feet of the inner and outer shells 22, 21 are above ground level 61 when the HLW storage container 100 is resting atop base 61 in the vertical orientation. In some embodiments, the hole may be dug sufficiently deep that the top edges of the inner and outer shells 22, 21 are flush with the ground level 62. In the illustrated embodiment, about 32 inches of the inner and outer shells 22, 21 protrude above the ground level 62.

An appropriate preservative, such as a coal tar epoxy or the like, can be applied to the exposed surfaces of outer shell 21 and the floor plate 50 in order to ensure sealing, to decrease decay of the materials, and to protect against fire and the ingress of below grade fluids. A suitable coal tar epoxy is produced by Carboline Company out of St. Louis, Mo. under the tradename Bitumastic 300M. In some embodiments, it may be preferable to also coat all surfaces of both the inner shell 22 and the outer shell 21 with the preservative, even though these surface are not directly exposed to the elements.

Once the HLW storage container 100 is resting atop base 61 in the vertical orientation, soil 60 is delivered into the hole exterior of the HLW storage container 100, thereby filling the hole with soil 60 and burying a major portion of the HLW integral structure 100. While soil 60 is exemplified to fill the hole and surround the HLW storage container 100, any suitable engineered fill can be used that meets environmental and shielding requirements. Other suitable engineered fills include, without limitation, gravel, crushed rock, concrete, sand, and the like. Moreover, the desired engineered fill can be supplied to the hole by any means feasible, including manually, dumping, and the like.

The soil 60 is supplied to the hole until the soil 60 surrounds the HLW storage container 100 and fills the hole to a level where the soil 60 is approximately equal to the ground level 62. The soil 60 is in direct contact with the exterior surfaces of the HLW storage container 100 that are below grade.

A radiation absorbing structure, such as a concrete pad 63, is provided around the portion of the outer shell 21 that protrudes above the ground level 62. The ring flange 77 of the outer shell 21 rests atop the top surface of the concrete pad 63. The concrete pad 63 is designed so as to be capable of providing the necessary radiation shielding for the portion of the HLW storage container 100 that protrudes from the ground. The top surface of the pad 63 also provides a riding surface for a cask crawler (or other device for transporting a transfer cask) during HLW transfer operations. The soil 60 provides the radiation shielding for the portion of the HLW storage container 100 that is below the ground level 62. The pad 63 also acts as a barrier membrane against gravity induced seepage of rain or flood water around the below grade portion of the HLW storage container 100.

A top view of the concrete pad 63 is shown in FIG. 7. While the pad 63 is preferably made of a reinforced concrete, the pad 63 can be made out of any material capable of suitably absorbing/containing the radiation being emitted by the HLW being stored in the cavity 24.

Referring again to FIG. 6, when the HLW storage apparatus 100 is adapted for the below grade storage of HLW and the lid 30 removed, the HLW storage apparatus 100 is a closed bottom, open top, thick walled cylindrical vessel that has no below grade penetrations or openings. Thus, ground water has no path for intrusion into the cavity 24. Likewise, any water that may be introduced into the cavity 24 through the inlet and outlet vents 33, 38 in the lid 30 will not drain out on its own.

Once the concrete pad 63 is in place, the lid 30 is placed atop the inner and outer shells 22, 21 as described above. Because the lid 30, which includes the openings of the inlet and outlet vents 33, 38 to the ambient, is located above grade, a hot canister of HLW can be stored in the cavity 24 below grade while still affording adequate ventilation of the canister for heat removal.

Referring now to FIG. 8, the process of storing a canister 90 loaded with hot HLW in a below grade HLW storage container 100 will be discussed. Upon being removed from a spent fuel pool and treated for dry storage, a canister 90 is positioned in a transfer cask. The transfer cask is carried by a cask crawler to a desired HLW storage container 100 for storage. While a cask crawler is exemplified, any suitable means of transporting a transfer cask can be used. For example, any suitable type of load-handling device, such as without limitation, a gantry crane, overhead crane, or other crane device can be used.

In preparing the desired HLW storage container 100 to receive the canister 90, the lid 30 is removed so that cavity 24 is open. The cask crawler positions the transfer cask atop the underground HLW storage container 100. After the transfer cask is properly secured to the top of the underground HLW storage container 100, a bottom plate of the transfer cask is removed. If necessary, a suitable mating device can be used to secure the connection of the transfer cask to the HLW storage container 100 and to remove the bottom plate of the transfer cask to an unobtrusive position. Such mating devices are well known in the art and are often used in canister transfer procedures.

The canister 90 is then lowered by the cask crawler from the transfer cask into the cavity 24 until the bottom surface of canister 90 contacts and rests atop the support blocks 52, as described above. When resting on support blocks 52, at least a major portion of the canister is below grade. Most preferably, the entirety of the canister 90 is below grade when in its storage position. Thus, the HLW storage container 100 provides for complete subterranean storage of the canister 90 in a vertical configuration inside the cavity 24. In some embodiments, the top surface of the pad 63 itself can be considered the grade level, depending on its size, radiation shielding properties, and cooperational relationship with the other storage modules in the ISFSI.

Once the canister 90 is positioned and resting in cavity 24, the lid 30 is positioned atop the body portion 20 of HLW storage container 100 as described above with respect to FIG. 3, thereby substantially enclosing cavity 24. An inlet air plenum exists below the canister 90 while an outlet air plenum exists above the canister 90. The outlet air plenum acts to boost the "chimney" action of the heated air out of the HLW storage container 100.

The lid 31 is then secured in place with bolts that extend into the concrete pad 63. As a result of the heat emanating from canister 90, cool air from the ambient is siphoned into the inlet vents 33, drawn through the space 23, and into the bottom of cavity 24 via the openings 25. This cool air is then warmed by the heat from the canister 90, rises in cavity 24 via the clearance space between the canister 90 and the inner shell 22, and then exits cavity 24 as heated air via the outlet vents 38 in the lid 30.

It should be recognized that the depth of the cavity 24 determines the height of the hot air column in the annular space 23 during the HLW storage container's 100 operation. Therefore, deepening the cavity 24 has the beneficial effect of increasing the quantity of the ventilation air and, thus, enhancing the rate of heat rejection form the stored canister 90. Further lowering the canister 90 into the cavity 24 will increase the subterranean depth of the radiation source, making the site boundary dose even more miniscule. Of course, constructing a deeper cavity 24 will entail increased excavation and construction costs.

A multitude of HLW storage containers 100 can be used at the same ISFSI site and situated in arrays as. Although the HLW storage containers 100 are closely spaced, the design permits a canister in a HLW storage containers 100 to be independently accessed and retrieved easily.

While the invention has been described and illustrated in sufficient detail that those skilled in this art can readily make and use it, various alternatives, modifications, and improvements should become readily apparent without departing from the spirit and scope of the invention.

What is claimed is:

1. A ventilated vertical system for storing high level waste comprising:
   an inner shell forming a cavity having a top, a bottom, and a substantially vertically oriented axis;
   an outer shell surrounding the inner shell so as to form a space between the inner shell and the outer shell;
   at least one opening in the inner shell, the at least one opening forming a passageway between the space and a bottom portion of the cavity; and
   a lid positioned atop the inner shell and the outer shell so as to form a lid-to-inner shell interface and a lid-to-outer shell interface, the lid being removable and non-unitary with respect to the inner shell and the outer shell, the lid-to-inner shell interface adapted to prevent air flow, the lid having at least one inlet vent forming a passageway between an ambient atmosphere and the space and at least one outlet vent forming a passageway between a top portion of the cavity and the ambient atmosphere.

2. The system of claim 1 wherein the inner shell and, the outer shell are substantially cylindrical in shape.

3. The system of claim 1 further comprising a radiation absorbing material surrounding the outer shell.

4. The system of claim 3 wherein the radiation absorbing material is a natural soil material or an engineered fill having a grade level, and wherein at least a majority of the inner shell and the outer shell are below grade level.

5. The system of claim 4 further comprising a floor plate, the inner and outer shells positioned atop the floor plate, a bottom edge of the outer shell integrally connected to the floor plate.

6. The system of claim 5 further comprising a foundation, the floor plate positioned atop and secured to the foundation.

7. The system of claim 4 wherein the inner and outer shell are sufficiently below grade so that when high level is positioned in the cavity, the entirety of the high level waste is located below grade.

8. The system of claim 4 wherein a portion of the inner shell and the outer shell extend above grade, the system further comprising a radiation absorbing structure surrounding the portion of the outer shell that extends above grade.

9. The system of claim 8 wherein approximately 1 to 3 feet of the inner shell and the outer shell extend above grade.

10. The system of claim 1 wherein the at least one inlet vent is a substantially horizontal passageway extending front an opening in a side wall of the lid to the space.

11. The system of claim 10 wherein the at least one outlet vent is a passageway that extends from an opening in a bottom surface of the lid to an opening in a top surface of the lid.

12. The system of claim 11 further comprising a cap covering the opening in the top surface of the lid, the cap comprising means for allowing heated air to exit the cavity via the at least one outlet vent and means for prohibiting rain water from entering the at least one outlet vent.

13. The system of claim 11 wherein the at least one outlet vent is curved or angled in shape.

14. The system of claim 11 wherein the top surface of the lid is sloped away from the opening in the top surface.

15. The system of claim 1 wherein the lid comprises a plug portion and a flange portion surrounding the plug portion, the plug portion extending into the cavity and the flange portion resting atop the inner and outer shells.

16. The system of claim 15 further comprising a first seal positioned between the inner shell and the flange portion of the lid and a second seal positioned between the outer shell and the flange portion of the lid.

17. The system of claim 1 wherein the inner shell and the outer shell are generally concentric to one another.

18. The system of claim 1 wherein the space formed between the inner shell and the outer shell is axisymmetric to the axis of the cavity.

19. The system of claim 18 wherein the space has a width in a range of approximately 1 to 6 inches.

20. The system of claim 1 wherein the inner shell is sized so that when a canister for storing high level waste is positioned in the cavity, a clearance exists between the canister and the inner shell.

21. The system of claim 1 wherein the lid comprises a first curved plate having a convex upper surface and concave lower surface, the lid further comprising a second curved plate spaced below the first curved plate, the at least one outlet vent being formed between the first curved plate and the second curved plate.

22. The system of claim 1 wherein the lid comprises a plurality of the inlet vents, each inlet vent extending from an opening in a side wall of the lid to the space, the openings of the inlet vents being axisymmetrically located about the side wall of the lid; and wherein the inner shell comprises a plurality of the openings, each of the openings forming a passageway from the space to the bottom portion of the cavity, the openings being axisymmetrically located about the axis of the cavity.

23. The system of claim 1 further comprising means for supporting a canister for storing high level waste emitting heat and radiation within the cavity so that a bottom air plenum exists between the canister and a floor of the cavity, the at least one opening in the inner shell forming a passageway between the space and the bottom air plenum.

24. The system of claim 1 further comprising:
a ring flange surrounding a top of the outer shell; and
the lid further comprising a ring-like structure extending from a bottom of the lid, the ring-like structure peripherally surrounding the ring flange.

25. The system of claim 1 wherein the lid comprises a substantially dome-shaped top surface.

26. The system of claim 1 wherein, the space is an annular space.

27. The system of claim 1 further comprising means for insulating at least a portion of the space from heat within the cavity.

28. The system of claim 27 wherein the insulating means comprises a layer of insulating material positioned between the cavity and the space.

29. The system of claim 28 wherein the layer of insulating material surrounds the cavity and extends from at or near the top of the cavity to at or near the bottom of the cavity.

30. The system of claim 27 further comprising:
- a floor plate, the inner and outer shells positioned atop the floor plate, a bottom edge of the outer shell hermetically connected to the floor plate;
- a natural soil material or an engineered fill surrounding the outer shell and having a grade level, at least a majority of the inner shell and the outer shell being below grade level;
- a below grade foundation, the floor plate positioned atop and secured to the foundation;
- means for supporting a canister for storing high level waste emitting heat and radiation within the cavity so that a bottom air plenum exists between the canister and the floor plate, the at least one opening in the inner shell forming a passageway between the space and the bottom air plenum;
- a first seal positioned between the inner shell and the lid;
- wherein the entire canister is located below grade level and a portion of the inner shell and the outer shell extend above grade level, a radiation absorbing structure surrounding the portion of the outer shell that extends above grade;
- wherein the insulating means is a layer of insulating material positioned between the cavity and the space, the layer of insulating material surrounding the cavity and extending from at or near the top of the cavity to at or near the bottom of the cavity; and
- wherein the lid comprises a plurality of the inlet vents, each inlet vent extending from an opening in a side wall of the lid to the space, the openings of the inlet vents being axisymmetrically located about the axis of the cavity; and
- wherein the inner shell comprises a plurality of the openings at or near the bottom of the cavity, the opening being axisymmetrically located about the axis of the cavity.

* * * * *